(12) United States Patent
Bernstein et al.

(10) Patent No.: US 11,399,160 B2
(45) Date of Patent: Jul. 26, 2022

(54) IMAGE SENSOR DOWN-UP SAMPLING USING A COMPRESSED GUIDE

(71) Applicant: SAMSUNG ELECTRONICS CO., LTD., Suwon-si (KR)

(72) Inventors: Tal Bernstein, Gedera (IL); Gal Bitan, Tikva (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 243 days.

(21) Appl. No.: 16/888,291

(22) Filed: May 29, 2020

(65) Prior Publication Data

US 2021/0377497 A1 Dec. 2, 2021

(51) Int. Cl.
*H04N 5/374* (2011.01)
*H04N 9/04* (2006.01)
*G06T 3/40* (2006.01)

(52) U.S. Cl.
CPC ....... *H04N 9/04551* (2018.08); *G06T 3/4007* (2013.01); *G06T 3/4015* (2013.01)

(58) Field of Classification Search
CPC ........... H04N 9/04551; H04N 9/04511; H04N 9/04515; H04N 9/0455; H04N 5/374; H04N 5/378; G06T 3/4007; G06T 3/4015
See application file for complete search history.

(56) References Cited

U.S. PATENT DOCUMENTS

| | | | | |
|---|---|---|---|---|
| 2010/0061625 | A1* | 3/2010 | Lukac | H04N 9/04557 382/162 |
| 2015/0348244 | A1* | 12/2015 | Zimmer | G06T 3/4015 382/167 |
| 2016/0275858 | A1* | 9/2016 | Wang | H01L 27/3211 |
| 2017/0039682 | A1* | 2/2017 | Oh | G06T 7/90 |

* cited by examiner

*Primary Examiner* — Mekonnen D Dagnew
(74) *Attorney, Agent, or Firm* — F. Chau & Associates, LLC

(57) ABSTRACT

A method for down-up sampling of image sensor data includes the steps of down sampling green pixels in a super Bayer pattern of image sensor data, where a decimation factor of the downsampling corresponds to a size of a color cluster in the super Bayer pattern, where two green pixels that are those closest to a non-green pixel cluster remain in each green cluster after downsampling, and wherein each non-green pixel cluster is bordered by four downsampled green pixels, and up sampling non-green color pixels in a non-green cluster from the remaining green pixels that are closest to the non-green cluster by a bilinear interpolation of each non-green pixel with respect to the closest remaining green pixels, where the up sampling of the non-green color pixels is guided by a compressed array that corresponds to the image sensor data.

20 Claims, 16 Drawing Sheets

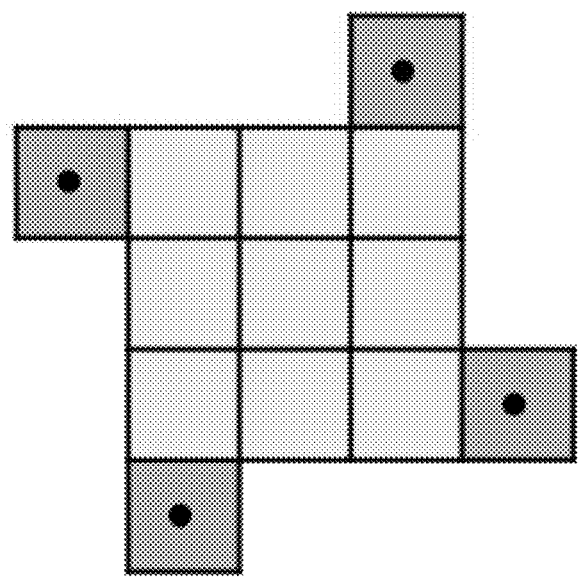
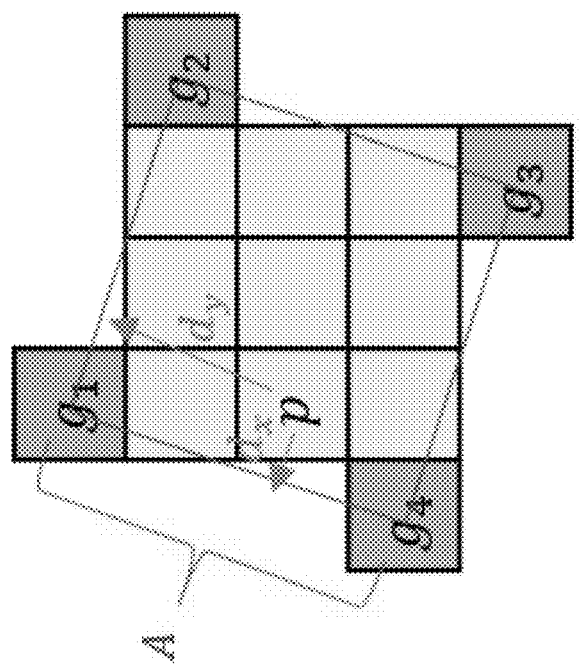
FIG. 4

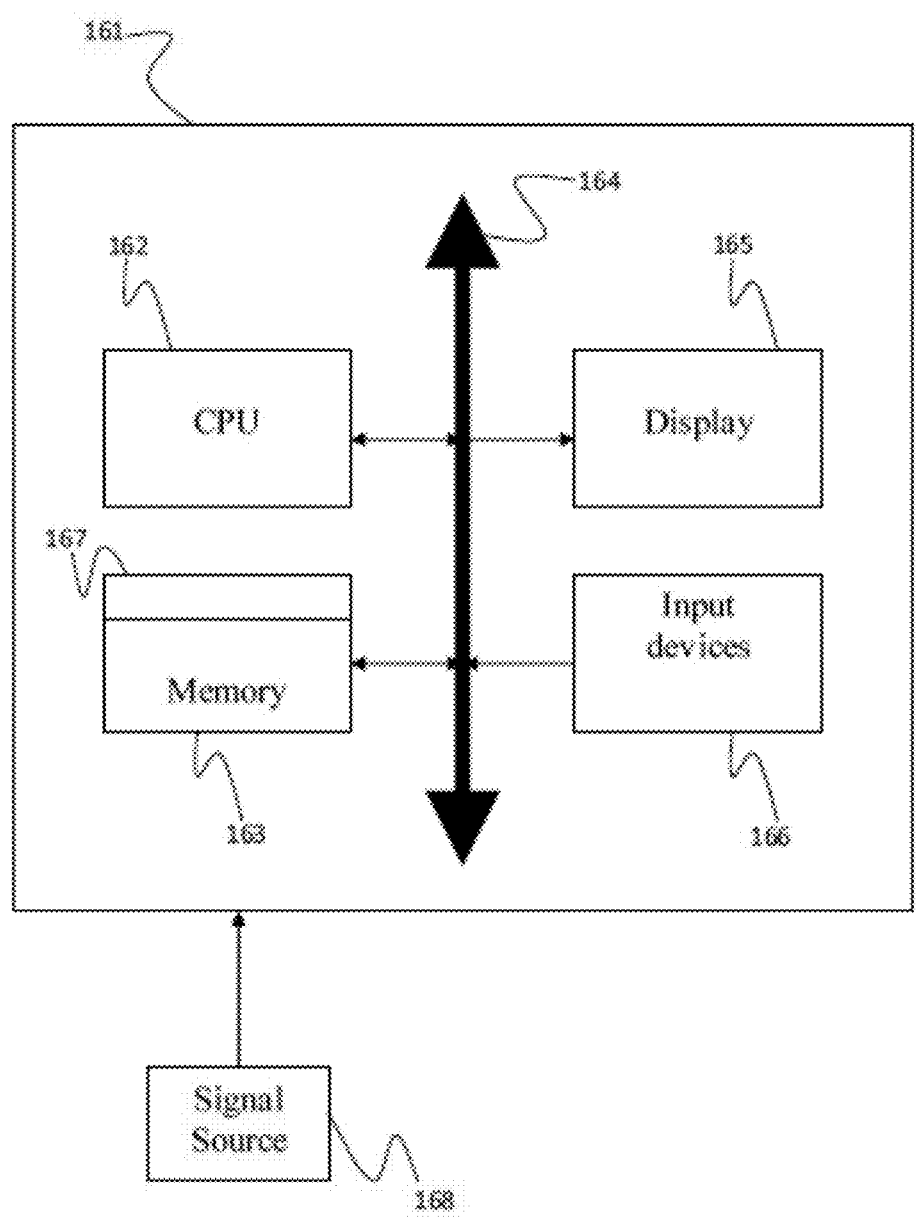

IMAGE SENSOR DOWN-UP SAMPLING USING A COMPRESSED GUIDE

TECHNICAL FIELD

Embodiments of the present disclosure are directed to methods for image processing using a CMOS sensor. More particularly, embodiments of the present disclosure are directed to the compensation of processing high resolution sensors using a sampled variation of the Bayer color filter array.

DISCUSSION OF THE RELATED ART

High resolution CMOS sensor patterns can acquire large amounts of information from a scene, but the information is unevenly distributed. A challenge in using these patterns is adjusting them to the standard Bayer pattern, and distributing the data of the scene evenly across the image. A color filter army (CFA) is an array of color filters placed over the sensors of an image sensor to capture color information. A Bayer filter mosaic is a commonly used CFA of RGB color filters on a square grid of photosensors that is 50% green, 25% red and 25% blue. It uses twice as many green elements as red or blue to mimic the physiology of the human eye, which in daylight is most sensitive to green light. Sample values sensed by the photosensors become image pixels after being interpolated. The raw output of Bayer-filter cameras is referred to as a Bayer pattern. A simple Bayer pattern has a repeated 2×2 pixel pattern with one red pixel, one blue pixel, and two diagonally opposed green pixels, while a super Bayer pattern comprises clusters of same colored pixels that mimic the arrangement of the simple Bayer pattern. However, since each pixel is filtered to record only one of three colors, the data from each pixel cannot fully specify each of the red, green, and blue values on its own. To obtain a full-color image, a demosaicing algorithm is used to interpolate a set of complete red, green, and blue values for each pixel. These algorithms make use of the colors of the surrounding pixels to estimate the color values for a particular pixel.

SUMMARY

Exemplary embodiments of the present disclosure are directed to systems and methods for estimating a full resolution grey pixel image from a down sampled CFA image, guided by compresses data from the full resolution image. Resolution loss in the down sampling process is compensated by a high resolution but low bittage guide such as an edge map or a direction map.

According to an embodiment of the disclosure, there is provided a method for down-up sampling of image sensor data, including the steps of: down sampling green pixels in a super Bayer pattern of image sensor data, wherein a decimation factor of the downsampling corresponds to a size of a color cluster in the super Bayer pattern, wherein two green pixels that are those closest to a non-green pixel cluster remain in each green cluster after downsampling, and wherein each non-green pixel cluster is bordered by four downsampled green pixels; and up sampling non-green color pixels in a non-green cluster from the remaining green pixels that are closest to the non-green cluster by a bilinear interpolation of each non-green pixel with respect to the closest remaining green pixels, wherein the up sampling of the non-green color pixels is guided by a compressed array that corresponds to the image sensor data.

According to a further embodiment of the disclosure, the decimation factor for an n×n color pixel array is $n^2$, and down sampling green pixels comprises keeping pixels at two diagonally opposites corners of the n×n color pixel array while flipping the diagonally opposite corners for alternate pixel array rows.

According to a further embodiment of the disclosure, the compressed array is one of a pixel direction map or an edge map, where the pixel direction map specifies one of six directions for each pixel, wherein the six directions are horizontal, vertical, slash, backslash, flat, and unknown.

According to a further embodiment of the disclosure, the pixel direction map is determined by splitting the image sensor data into red, green and blue clusters. The method further includes, within each cluster, determining if each pixel is flat by using a max-min measurement for each pixel and comparing the max-min measurement to a threshold, wherein if the max-min measurement for a pixel is below this threshold, the pixel is determined to be flat, and if the pixel is determined to be non-flat, determining a direction for the pixel.

According to a further embodiment of the disclosure, determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold.

According to a further embodiment of the disclosure, determining a direction for the pixel comprises calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch, wherein if a pixel direction's difference is not smaller than the other directions' differences within a predetermined interval, the pixel's direction is denoted as unknown.

According to a further embodiment of the disclosure, up sampling non-green color pixels in a non-green cluster using the direction map includes interpolating a flat or unknown direction pixel $\hat{p}$ in a cluster being up sampled from the down sampled green pixels $g_1$, $g_2$, $g_3$ and $g_4$ according to $$\hat{p} = \frac{(A-d_x)(A-d_y)}{A^2}g_1 + \frac{d_x(A-d_y)}{A^2}g_2 + \frac{d_x d_y}{A^2}g_3 + \frac{(A-d_x)d_y}{A^2}g_4,$$

wherein A is an edge length of the cluster being up sampled and $(d_x, d_y)$ are the distances of pixel $\hat{p}$ from green pixel $g_1$; interpolating a horizontal, vertical, slash or backslash direction pixel $\hat{p}$ in the cluster being up sampled according to $$\hat{p} = \frac{d_2}{d_1+d_2}g_1 + \frac{d_1}{d_1+d_2}g_2,$$

when there are down sampled green pixels $g_1$, $g_2$ collinear to pixel $\hat{p}$ in the direction, wherein $[d_1, d_2]$ are distances from pixel $\hat{p}$ to the collinear down sampled green pixels $g_1$, $g_2$, respectively; interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$

$$\hat{p}_1 = \frac{d_2}{d_1 + d_2}g_1 + \frac{d_1}{d_1 + d_2}g_2,$$

$$\hat{p}_2 = \frac{d_4}{d_3 + d_4}g_3 + \frac{d_3}{d_3 + d_4}g_4,$$

wherein $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively; and interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + \hat{c}_2),$$

$$\hat{c}_1 = \frac{d_2}{d_1 + d_2}g_1 + \frac{d_1}{d_1 + d_2}g_2,$$

$$\hat{c}_2 = \frac{d_4}{d_3 + d_4}g_3 + \frac{d_3}{d_3 + d_4}g_4,$$

wherein $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

According to a further embodiment of the disclosure, up sampling non-green color pixels in a non-green cluster using the edge map includes drawing imaginary straight lines from a pixel $\hat{p}$ to be up sampled to each of the four down sampled green pixels, and eliminating a down sampled green pixel $g_k$ when an imaginary straight lines from a pixel $\hat{p}$ to down sampled green pixel $g_k$ crosses an edge pixel; and interpolating p from the four down sampled green pixels $g_1$, $g_2$, $g_3$ and $g_4$ according to $$\hat{p} = \frac{\sum_{i=1, i \neq k}^{4} w_i \cdot g_i}{\sum_{i=1, i \neq k}^{4} w_i}, \text{ wherein } w_1 = \frac{(A - d_x)(A - d_y)}{A^2},$$

$$w_2 = \frac{d_x(A - d_y)}{A^2}, w_3 = \frac{d_x d_y}{A^2}, \text{ and } w_4 = \frac{(A - d_x)d_y}{A^2},$$

wherein A is an edge length of the cluster being up sampled and $(d_x, d_y)$ are the distances of pixel $\hat{p}$ from green pixel $g_1$, wherein if all four downsampled green pixels are eliminated, interpolating $\hat{p}$ from the closest down sampled pixel: $\hat{p} = g_{closest}$.

According to another embodiment of the disclosure, there is provided a non-transitory program storage device readable by a computer, tangibly embodying a program of instructions executed by the computer to perform a method for down-up sampling of image sensor data, wherein the method includes the steps of: down sampling green pixels in a super Bayer pattern of image sensor data, wherein the decimation factor for an n×n color pixel array is $n^2$, and wherein down sampling green pixels comprises keeping pixels at two diagonally opposites corners of the n×n color pixel array while flipping the diagonally opposite corners for alternate pixel array rows; and up sampling non-green color pixels in a non-green cluster from the remaining green pixels that are closest to the non-green cluster by a bilinear interpolation of each non-green pixel with respect to the closest remaining green pixels, wherein the up sampling of the non-green color pixels is guided by a compressed array that corresponds to the image sensor data.

According to a further embodiment of the disclosure, a decimation factor of the downsampling corresponds to a size of a color cluster in the super Bayer pattern, and wherein two green pixels that are those closest to a non-green pixel cluster remain in each green cluster after downsampling, and wherein each non-green pixel cluster is bordered by four downsampled green pixels.

According to a further embodiment of the disclosure, the compressed array is one of a pixel direction map or an edge map, wherein the pixel direction map specifies one of six directions for each pixel, wherein the six directions are horizontal, vertical, slash, backslash, flat, and unknown.

According to a further embodiment of the disclosure, the pixel direction map is determined by splitting the image sensor data into red, green and blue clusters. The method further comprises, within each cluster, determining if each pixel is flat by using a max-min measurement for each pixel and comparing the max-min measurement to a threshold, wherein if the max-min measurement for a pixel is below this threshold, the pixel is determined to be flat, and if the pixel is determined to be non-flat, determining a direction for the pixel.

According to a further embodiment of the disclosure, determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold.

According to a further embodiment of the disclosure, determining a direction for the pixel includes calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch, wherein if a pixel direction's difference is not smaller than the other directions' differences within a predetermined interval, the pixel's direction is denoted as unknown.

According to a further embodiment of the disclosure, up sampling non-green color pixels in a non-green cluster using the direction map includes interpolating a flat or unknown direction pixel $\hat{p}$ in a cluster being up sampled from the down sampled green pixels $g_1$, $g_2$, $g_3$ and $g_4$ according to $$\hat{p} = \frac{(A - d_x)(A - d_y)}{A^2}g_1 + \frac{d_x(A - d_y)}{A^2}g_2 + \frac{d_x d_y}{A^2}g_3 + \frac{(A - d_x)d_y}{A^2}g_4,$$

wherein A is an edge length of the cluster being up sampled and $(d_x, d_y)$ are the distances of pixel $\hat{p}$ from green pixel $g_1$; interpolating a horizontal, vertical, slash or backslash direction pixel $\hat{p}$ in the cluster being up sampled according to $$\hat{p}_1 = \frac{d_2}{d_1+d_2}g_1 + \frac{d_1}{d_1+d_2}g_2,$$

when there are down sampled green pixels $g_1$, $g_2$ collinear to pixel $\hat{p}$ in the direction, wherein $[d_1, d_2]$ are distances from pixel $\hat{p}$ to the collinear down sampled green pixels $g_1$, $g_2$, respectively; interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$
$$\hat{p}_1 = \frac{d_2}{d_1+d_2}g_1 + \frac{d_1}{d_1+d_2}g_2,$$
$$\hat{p}_2 = \frac{d_4}{d_3+d_4}g_1 + \frac{d_3}{d_3+d_4}g_4,$$

wherein $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively; and interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + c_2),$$
$$\hat{c}_1 = \frac{d_2}{d_1+d_2}g_1 + \frac{d_1}{d_1+d_2}g_2,$$
$$\hat{c}_2 = \frac{d_4}{d_3+d_4}g_1 + \frac{d_3}{d_3+d_4}g_4,$$

wherein $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

According to a further embodiment of the disclosure, up sampling non-green color pixels in a non-green cluster using the edge map includes drawing imaginary straight lines from a pixel $\hat{p}$ to be up sampled to each of the four down sampled green pixels, and eliminating a down sampled green pixel $g_k$ when an imaginary straight lines from a pixel $\hat{p}$ to down sampled green pixel $g_k$ crosses an edge pixel; and interpolating p from the four down sampled green pixels $g_1$, $g_2$, $g_3$ and $g_4$ according to $$\hat{p} = \frac{\sum_{i=1, i \neq k}^{4} w_i \cdot g_i}{\sum_{i=1, i \neq k}^{4} w_i}$$

wherein $$w_1 = \frac{(A-d_x)(A-d_y)}{A^2}, w_2 = \frac{d_x(A-d_y)}{A^2}, w_3 = \frac{d_x d_y}{A^2}, \text{ and } w_4 = \frac{(A-d_x)d_y}{A^2},$$

wherein A is an edge length of the cluster being up sampled and $(d_x, d_y)$ are the distances of pixel $\hat{p}$ from green pixel $g_1$, wherein if all four downsampled green pixels are eliminated, interpolating $\hat{p}$ from the closest down sampled pixel: $\hat{p} = g_{closest}$.

According to another embodiment of the disclosure, there is provided a method for down-up sampling of image sensor data, including down sampling green pixels in a super Bayer pattern of image sensor data, wherein the decimation factor for an n×n color pixel array is $n^2$, and wherein down sampling green pixels comprises keeping pixels at two diagonally opposites corners of the n×n color pixel array while flipping the diagonally opposite corners for alternate pixel array rows; and up sampling non-green color pixels in a non-green cluster from the remaining green pixels that are closest to the non-green cluster guided by a compressed array that corresponds to the image sensor, wherein the compressed array is one of a pixel direction map, wherein the pixel direction map specifies one of six directions for each pixel, wherein the six directions are horizontal, vertical, slash, backslash, flat, and unknown, wherein the pixel direction map is determined by splitting the image sensor data into red, green and blue clusters, within each cluster, determining if each pixel is flat by using a max-min measurement for each pixel and comparing the max-min measurement to a threshold, wherein if the max-min measurement for a pixel is below this threshold, the pixel is determined to be flat, and if the pixel is determined to be non-flat, determining a direction for the pixel.

According to a further embodiment of the disclosure, determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold. Determining a direction for the pixel includes calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch, where if a pixel direction's difference is not smaller than the other directions' differences within a predetermined interval, the pixel's direction is denoted as unknown.

According to a further embodiment of the disclosure, up sampling non-green color pixels in a non-green cluster from the remaining green pixels that are closest to the non-green cluster is performed by a bilinear interpolation of each non-green pixel with respect to the closest remaining green pixels, wherein the up sampling of the non-green color pixels is guided by a compressed array that corresponds to the image sensor data.

According to a further embodiment of the disclosure, up sampling non-green color pixels in a non-green cluster guided by the direction map includes interpolating a flat or unknown direction pixel $\hat{p}$ in a cluster being up sampled from the down sampled green pixels $g_1$, $g_2$, $g_3$ and $g_4$ according to $$\hat{p} = \frac{(A-d_x)(A-d_y)}{A^2}g_1 + \frac{d_x(A-d_y)}{A^2}g_2 + \frac{d_x d_y}{A^2}g_3 + \frac{(A-d_x)d_y}{A^2}g_4,$$

wherein A is an edge length of the cluster being up sampled and $(d_x, d_y)$ are the distances of pixel $\hat{p}$ from green pixel $g_1$; interpolating a horizontal, vertical, slash or backslash direction pixel $\hat{p}$ in the cluster being up sampled according to $$\hat{p} = \frac{d_2}{d_1+d_2}g_1 + \frac{d_1}{d_1+d_2}g_2,$$

when there are down sampled green pixels $g_1$, $g_2$ collinear to pixel $\hat{p}$ in the direction, wherein $[d_1, d_2]$ are distances from pixel $\hat{p}$ to the collinear down sampled green pixels $g_1$, $g_2$, respectively; interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$
$$\hat{p}_1 = \frac{d_2}{d_1+d_2}g_1 + \frac{d_1}{d_1+d_2}g_2,$$
$$\hat{p}_2 = \frac{d_4}{d_3+d_4}g_3 + \frac{d_3}{d_3+d_4}g_4,$$

wherein $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively; and interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + c_2),$$
$$\hat{c}_1 = \frac{d_2}{d_1+d_2}g_1 + \frac{d_1}{d_1+d_2}g_2,$$
$$\hat{c}_2 = \frac{d_4}{d_3+d_4}g_3 + \frac{d_3}{d_3+d_4}g_4,$$

wherein $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

BRIEF DESCRIPTION OF THE DRAWINGS

FIG. 4 illustrates the closest green pixels for performing bilinear interpolation, according to an embodiment of the disclosure.

FIG. 16 is a block diagram of a system that implements a method for down-up sampling guided by a compressed data, according to an embodiment of the disclosure.

DETAILED DESCRIPTION OF EXEMPLARY EMBODIMENTS

Figure 1:
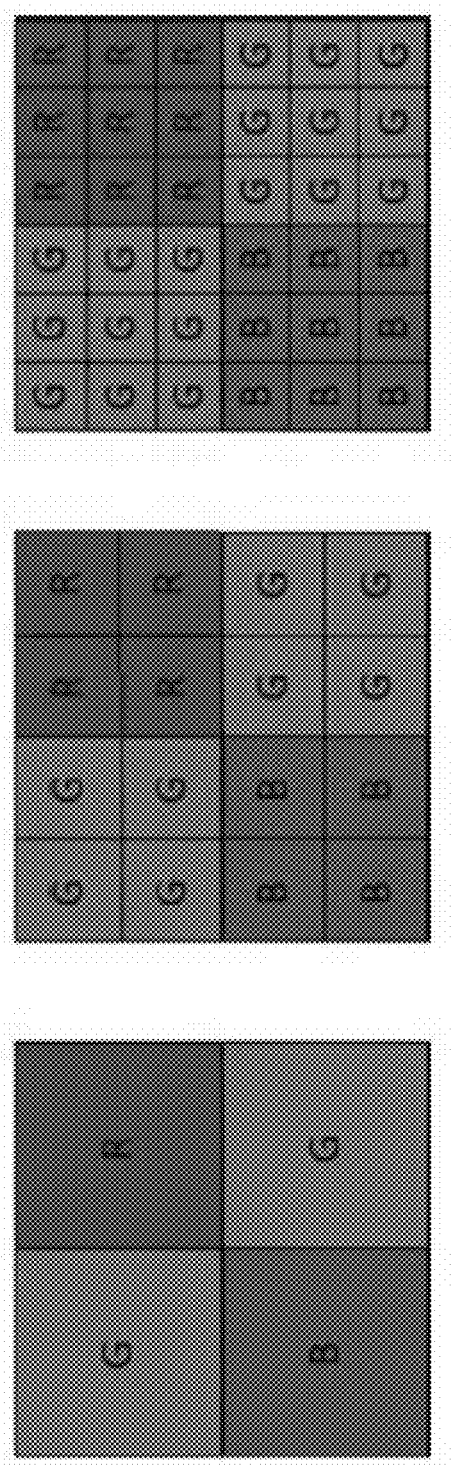
FIG. 1 illustrates various CFA patterns, according to an embodiment of the disclosure.

Exemplary embodiments of the disclosure as described herein generally provide systems and methods for down-up sampling guided by a compressed data. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

Embodiments of the disclosure are directed to CMOS imaging sensors based on up sampled Bayer CFA patterns such as Tetra or Nona cell CFAs. FIG. 1 illustrates several CFA patterns, according to an embodiment of the disclosure. From left to right, the illustrated patterns are a simple Bayer pattern, a Tetra pattern, which is a super Bayer pattern where each color cluster is a 2×2 pixel array, and a Nona pattern, which is another super Bayer pattern where each color cluster is a 3×3 pixel array. Another super Bayer pattern is a Hexa pattern where each color cluster is a 4×4 pixel array. The illustrated patterns are exemplary and non-limiting, and other patterns exist based on larger sized color pixel arrays. The green pixels take up half of the sensor area because of their high responsivity to light and the fact that natural light comprises more green components than red or blue.

For that reason, according to an embodiment, sensor image processing uses a full resolution green map to extract fine details from a captured scene. One significant function of an image processing pipeline is estimating a Bayer pattern from a larger size super-Bayer color pixel array, such as Nona pattern or a Tetra pattern, a process known as remosaicing. An initial stage in a remosaicing process is generating a full image of green pixels to evenly distribute the acquired data. A principle according to an embodiment of the disclosure is compensating for resolution loss in the down-sampling process by using a high resolution but low bittage guide such as an edge map or a direction map in the up-sampling process.

According to an embodiment of the disclosure, a low power method is used to estimate the full resolution of a green image from large sized pixel array pattern sensor data using down sampled data, and up sampling is performed guided by high resolution compressed data to retrieve fine details lost in the down sampling process. For simplicity of exposition, embodiments of the disclosure will be described for processing a Nona pattern, however, those of skill in the art can readily implement the described methods for different size color pixel arrays.

Figure 2:
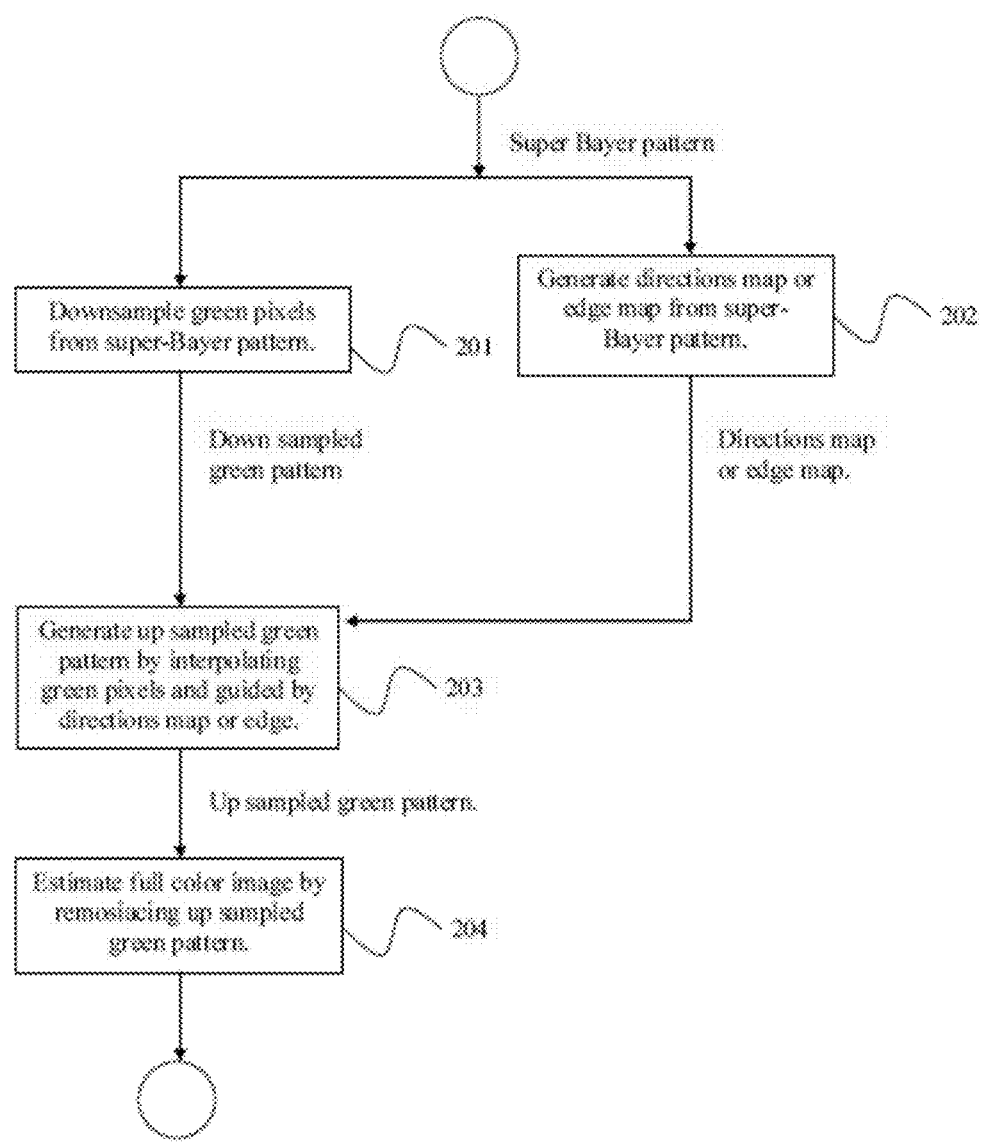
FIG. 2 is a flow chart of down-up sampling process guided by compressed data, according to an embodiment of the disclosure.
Figure 3:
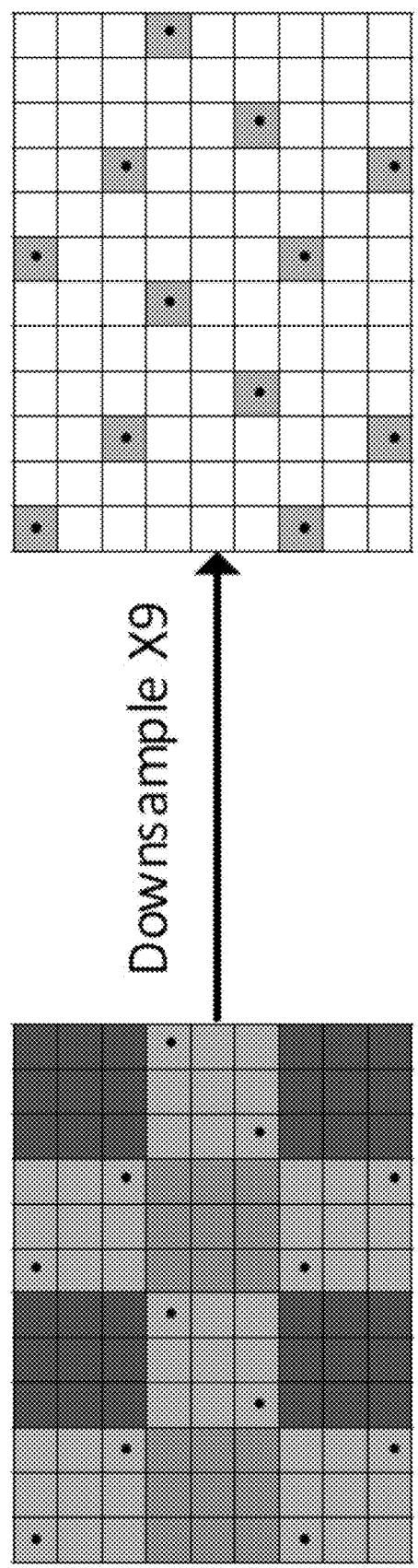
FIG. 3 illustrates the down sampling of green pixels from Nona pattern data, according to an embodiment of the disclosure.

FIG. 2 is a flow chart of a down-up sampling process for a Nona pattern guided by compressed data, according to an embodiment of the disclosure. Referring now to the figure, and given a super-Bayer Nona pattern received from an imaging sensor, a first step 201 is down sampling green pixels to keep the most relevant pixels for estimating green pixels in the blue and red Nona cells. According to an embodiment, decimation by a factor of 9 is performed, where 2 green pixels are kept from each green cluster so that there are 4 green neighbors for each blue and red Nona cell estimation. More generally, for an n×n color pixel array, the decimation is by a factor of $n^2$, however, 4 green neighbors are kept for each n×n cell estimation. In an embodiment, those green neighbors that are kept are those closest to a red or blue Nona cell, however, embodiments are not limited thereto. In other embodiments, green neighbor pixels that are not necessarily closest to a red or blue Nona cell are kept. FIG. 3 illustrates a 9 factor down sampling of green pixels from Nona pattern data. Note that even though 2 of 9 green pixels are kept from each 3×3 cluster, none of the red or blue pixels are kept. In addition, at step 202, a directions map or edge map, used for guiding the up sampling, is generated from the super-Bayer pattern. Methods of generating edge maps are known in the art. A method of generating a directions map will be described below.

In general, for down sampling according to an embodiment, a rule is to keep two diagonally opposites corners of the square array while flipping the opposite corners for alternate array rows, as shown in the Nona array at the left side of FIG. 2.

After down sampling, low resolution green pixels remain. According to an embodiment, at step 203, upsampling is performed to generate an upsampled green map. To perform up sampling, diluted data at high resolution is used as a guide, such as the pixel directions map or the edge map. An up-sampling is performed not only for the red and blue pixels, but also for green pixels that were eliminated during the down sampling. At step 204, the upsampled green map is remosaiced to generate a full color image.

According to an embodiment, based on the pattern, a simple bi-linear interpolation can be used on the closest neighbors for the color pixels. A bilinear interpolation equation, with 4 reference pixels ($g_1$, $g_2$, $g_3$, $g_4$) in the corners of a square shape with edge size A, where A is the distance between two adjacent interpolated pixels, for a pixel p whose distances from $g_1$ are ($d_x$, $d_y$) is:

$$\hat{p} = \frac{(A-d_x)(A-d_y)}{A^2}g_1 + \frac{d_x(A-d_y)}{A^2}g_2 + \frac{d_xd_y}{A^2}g_3 + \frac{(A-d_x)d_y}{A^2}g_4, \quad (1)$$

The up sampling interpolation formula of EQ. (1) is the same regardless of the size of the color array.

According to an embodiment, assuming a pixel of unit size, $A=\sqrt{n^2+}=\sqrt{10}\approx 3.16$ pixels for a Nona pattern where n=3. FIG. 4 illustrates examples of interpolating red pixels from 4 closest green pixels, and shows A, the distance between two adjacent interpolated pixels, which is the square side length.

Figure 5:
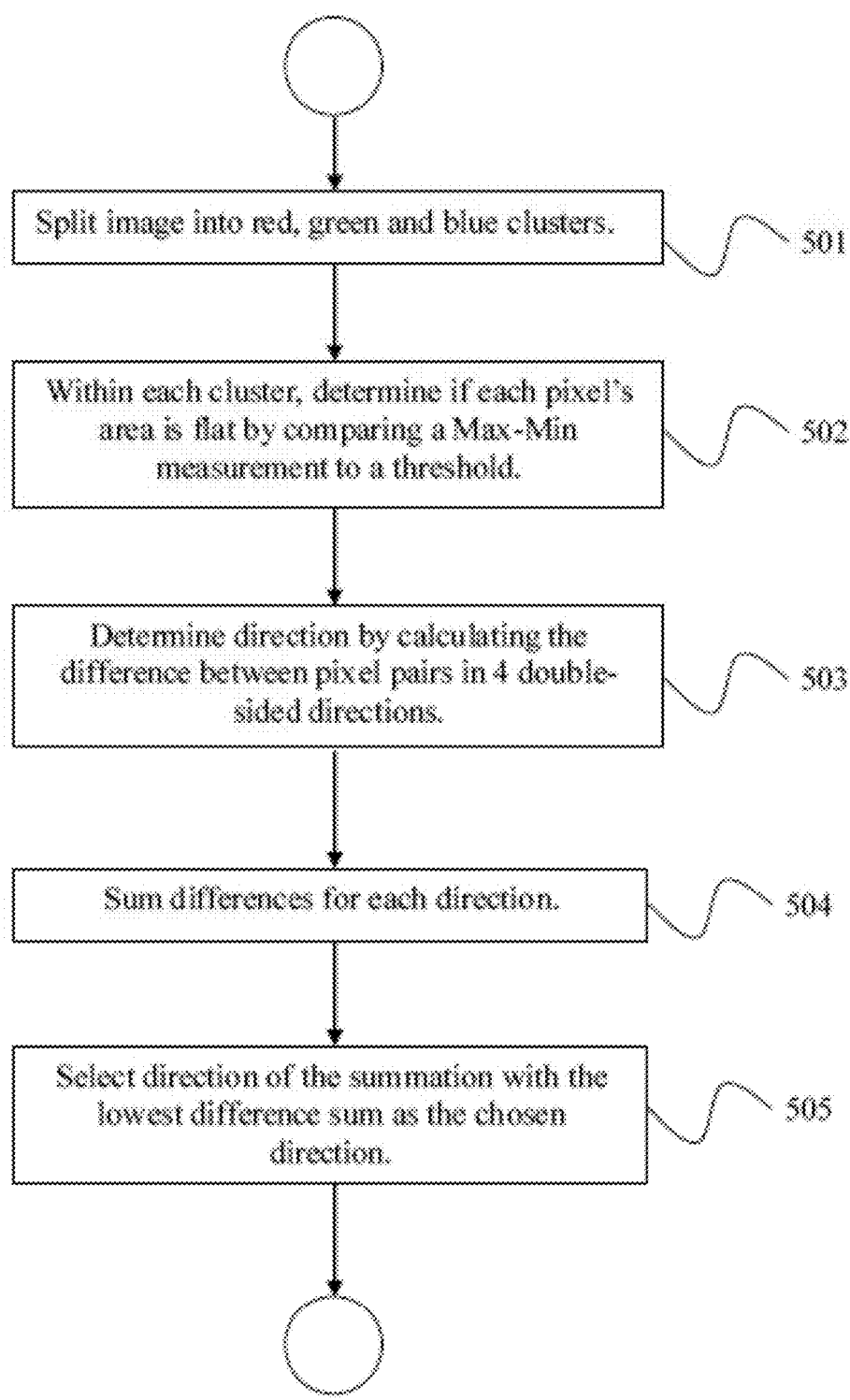
FIG. 5 is a flow chart of a method for generating a directions map, according to an embodiment of the disclosure.

According to an embodiment, a compressed guide used for up sampling is a 3 bit directions map which indicates for each pixel one of 6 options: a horizontal direction, a vertical direction, a back slash direction, a slash direction, a flat area, and an unknown indication. FIG. 5 is a flow chart of a method for generating a directions map, according to an embodiment of the disclosure. A first step 501 in generating a directions map is splitting the image into red, green and blue clusters, and then working on each cluster separately.

According to an embodiment, a next step 502, is, within each cluster, determining if each pixel's area is flat, using, a Max-Min measurement, and comparing it to a threshold. This is accomplished by searching a patch of pixels for a maximum (max) and minimum (min) for each color in the patch, and calculating a max-min value for the color. The size of the patch to be searched should be larger than the cluster size of the pixel array pattern, to obtain better statistics, and thus the patch will overlap clusters of different colors. The "max-min" value is then compared to a flatness threshold. If the three max-min values are below this threshold, the pixel at the center of the patch is determined to be flat. This calculation is performed for each pixel in a color cluster, and thus a given cluster may have flat and non-flat pixels.

Next, for the non-flat pixels, the direction of a pixel is calculated. The direction is determined at step 503 by calculating the difference between pixel pairs in 4 double-sided directions (DSDs): horizontal (H); vertical (V); slash (S), which is a diagonal direction rotated 45° counter-clockwise from the horizontal; and backslash (B), which is a diagonal direction rotated 135° counter-clockwise from the horizontal, and the direction where these differences are the smallest is found.

The calculation is performed for every pair of adjacent pixels with the same color in the patch, and those differences for the same direction are summed at step 504, for a total of 4 summations. At step 505, the direction of the summation with the lowest difference sum is the chosen direction.

Figure 6:
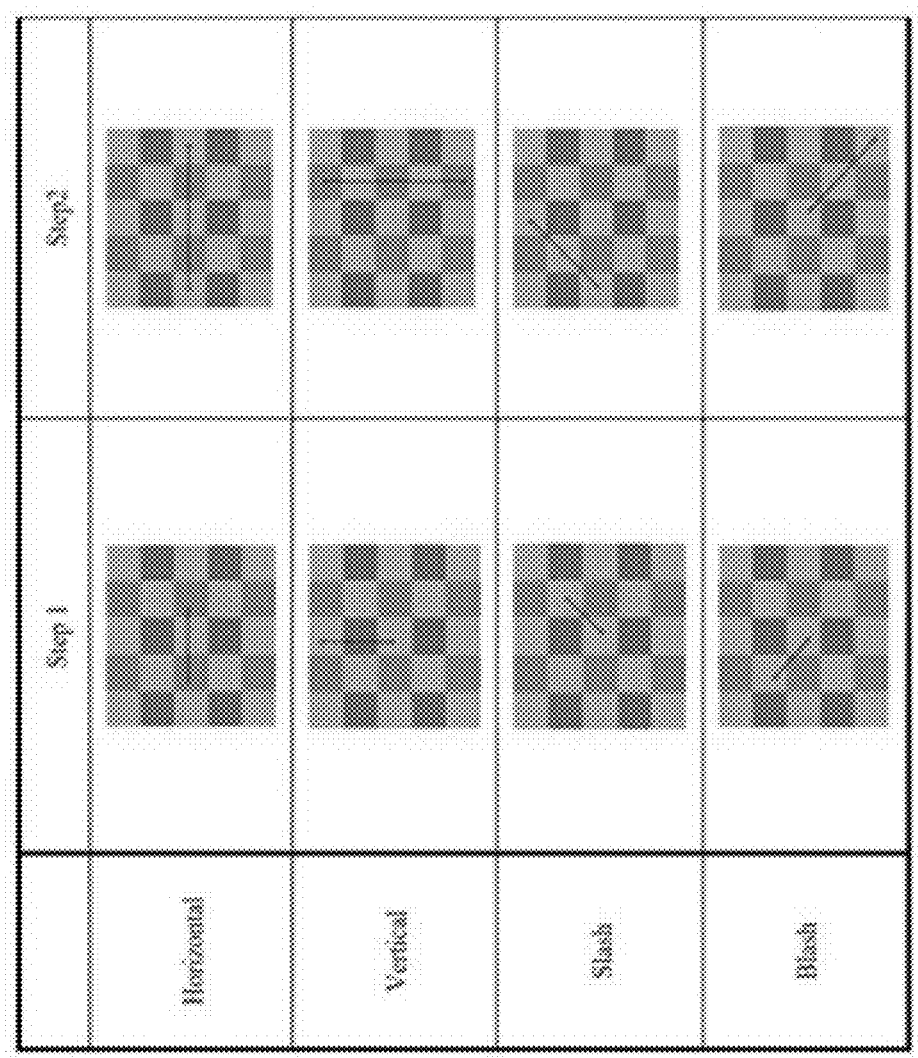
FIG. 6 illustrates some examples for pixel couples in a simple Bayer pattern case, according to an embodiment of the disclosure.

FIG. 6 illustrates some examples for pixel couples in a simple Bayer pattern case for the Horizontal, Vertical, Slash and Backslash (Blash) directions. Step 2 is used only where there are "bad" pixels in the cluster, such as auto focus pixels or very noisy pixels.

If a good direction cannot be found, meaning that the main direction's difference is either big or not significantly smaller than the other directions, the pixel's direction will be denoted as "Unknown", meaning that a direction for the pixel could not be found for the pixel.

Figure 7:
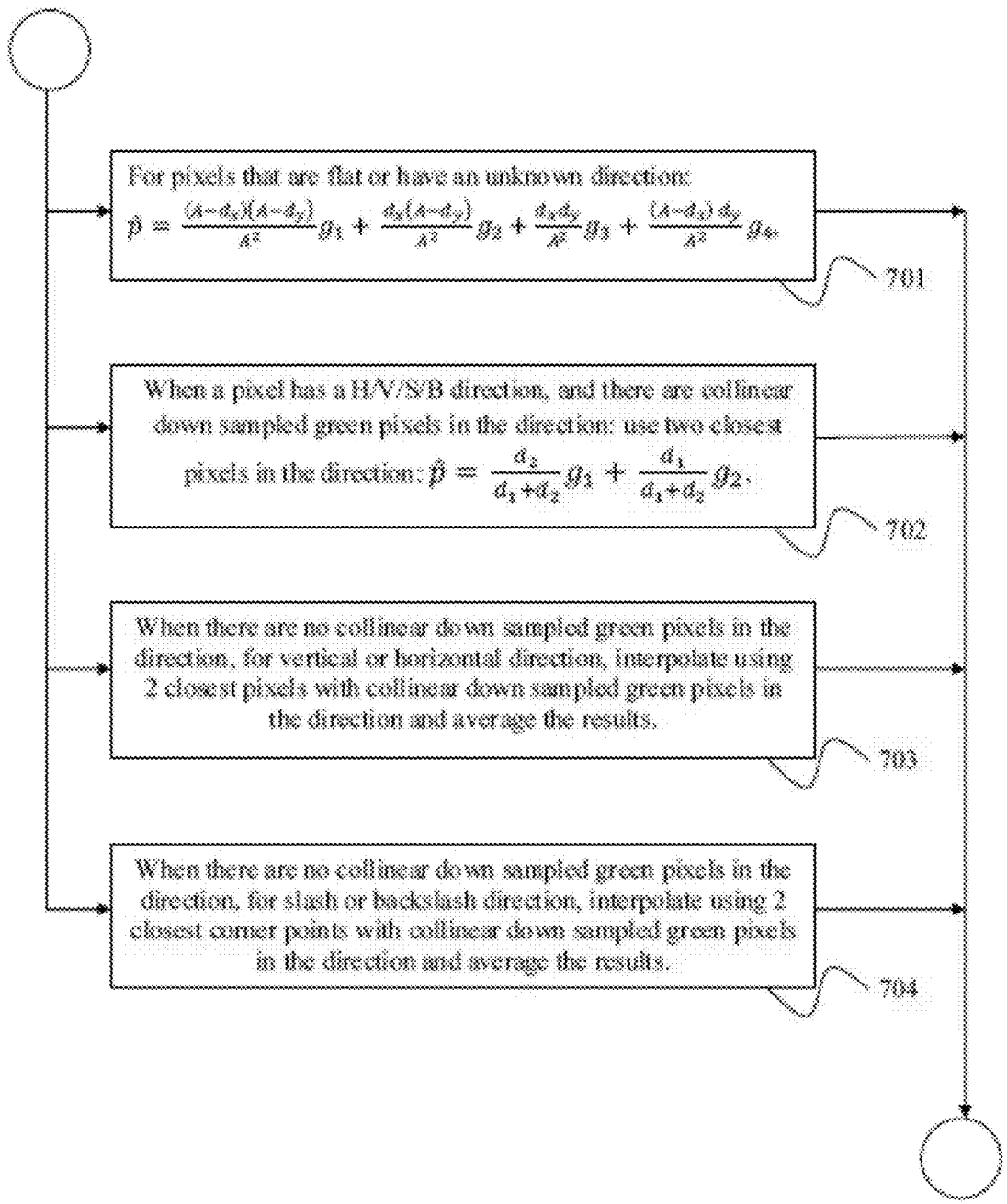
FIG. 7 is a flow chart of a method of using directions to guide the interpolated upsampling of the green pixels, according to an embodiment of the disclosure.

FIG. 7 is a flow chart of a method of using directions to guide the interpolated upsampling of the green pixels, according to an embodiment of the disclosure. At step 701, for pixels that are flat or have an unknown direction, the bilinear interpolation formula of EQ. (1) can be used:

$$\hat{p} = \frac{(A-d_x)(A-d_y)}{A^2}g_1 + \frac{d_x(A-d_y)}{A^2}g_2 + \frac{d_x d_y}{A^2}g_3 + \frac{(A-d_x)d_y}{A^2}g_4,$$

where $\hat{p}$ represents a pixel value in an up sampled cluster, and $g_1$, $g_2$, $g_3$ and $g_4$ are the down sampled green pixels.

According to an embodiment, a different interpolation is used when a pixel has a H/V/S/B direction. According to an embodiment, there are 2 cases.

a. There are collinear down sampled green pixels in the direction:

In this case, at step 702, linear interpolation is used with the two closest pixels in the direction:

$$\hat{p} = \frac{d_2}{d_1+d_2}g_1 + \frac{d_1}{d_1+d_2}g_2,$$

where $[g_1, g_2]$ are the collinear down sampled green pixels, and $[d_1, d_2]$ are the distances from the estimated pixel to the collinear down sampled green pixel.

Figure 8:
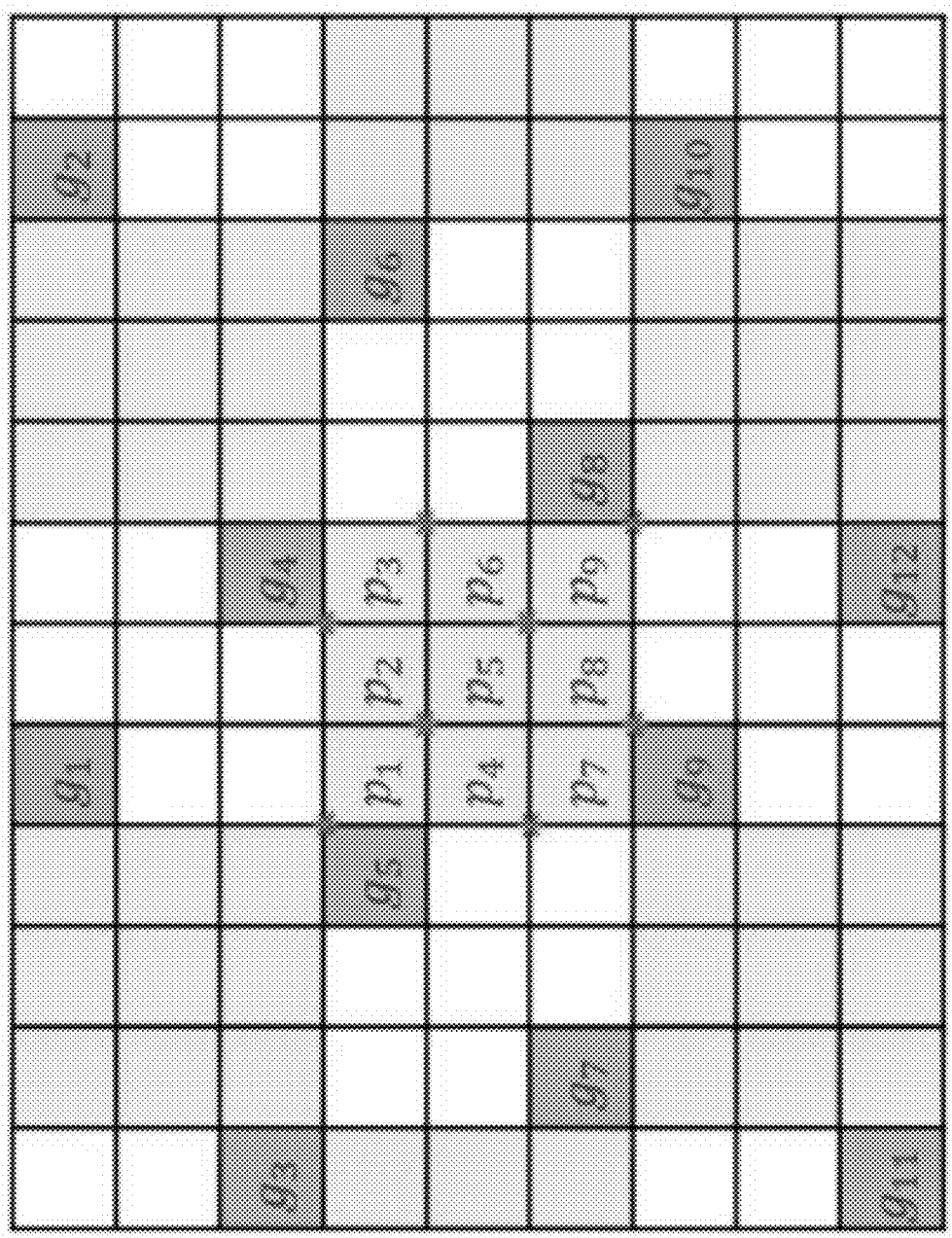
FIG. 8 illustrates examples of interpolation when a pixel has a direction, according to an embodiment of the disclosure.

The following are some examples illustrated in FIG. 8:

If the direction is "Vertical" (V) and the pixel is one of [p1, p4, p7] or [p3, p6, p9], use [g1, g9] or [g4, g12], respectively;

If the direction is "Slash" (S) and the pixel is one of [p2, p4] or [p6, p8], use [g4, g11] or [g2, g8], respectively;

"Horizontal" (H) and "Blash" (B) directions are calculated similarly.

b. There are no collinear down sampled green pixels in the direction:

In this case, 2 linear interpolation are used to calculate 2 closest pixels that agree with case a, and averaging the 2 results.

The following are some examples illustrated in FIG. 8:

If the direction is "Vertical" (V) and the pixel is one of p2 or p5 or p8, calculate [p1, p3], or [p4, p6] or [p7, p9], respectively, and average the two results. Here, at step 703, $$\hat{p} = \frac{1}{2}(\hat{p}_1 + \hat{p}_2),$$

$$\hat{p}_1 = \frac{d_2}{d_1+d_2}g_1 + \frac{d_1}{d_1+d_2}g_2,$$

$$\hat{p}_2 = \frac{d_4}{d_3+d_4}g_3 + \frac{d_3}{d_3+d_4}g_4,$$

where $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively.

If the direction is "Slash" (S) and the pixel is one of p1, p3, p5, p7 or p9, perform linear interpolation in the "Slash" (S) direction using the two diagonally opposite corner points of the pixel that on a line that is perpendicular to the slash direction, and the calculated pixel is the average of those two points. Here, at step 704, $$\hat{p} = \frac{1}{2}(\hat{c}_1 + c_2),$$

$$\hat{c}_1 = \frac{d_2}{d_1+d_2}g_1 + \frac{d_1}{d_1+d_2}g_2,$$

$$\hat{c}_2 = \frac{d_4}{d_3+d_4}g_3 + \frac{d_3}{d_3+d_4}g_4,$$

where $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

"Horizontal" (H) and "Blash" (B) directions are calculated similarly.

According to an embodiment, to perform linear interpolation in the "Slash" (S) direction using the two diagonally opposite corner points in the image, a first step is to find the closest down sampled green pixels that are collinear to each corner point of the estimated pixel, one in a negative slash (or negative blash) direction, and one in the positive slash (or positive blash) direction. Note that for pixel $p_1$ in FIG. 8, for the upper left corner, one of the closest down sampled green pixels is g5, but the other is a pixel that is above the cluster shown in the figure. For lower right corner of $p_1$, the closest down sampled green pixels are $g_{11}$ and $g_4$. The pixel value for each corner is a linear interpolation of the closest collinear down sampled green pixels. The estimated pixel is then determined by linearly interpolating the two corner points.

Figure 9:
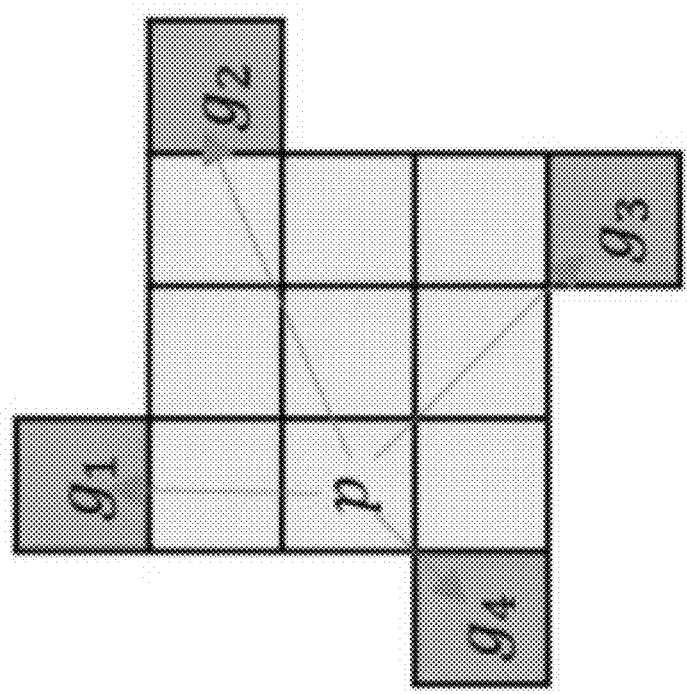
FIG. 9 illustrates the use of an edge map for up sampling, according to an embodiment of the disclosure.
Figure 10:
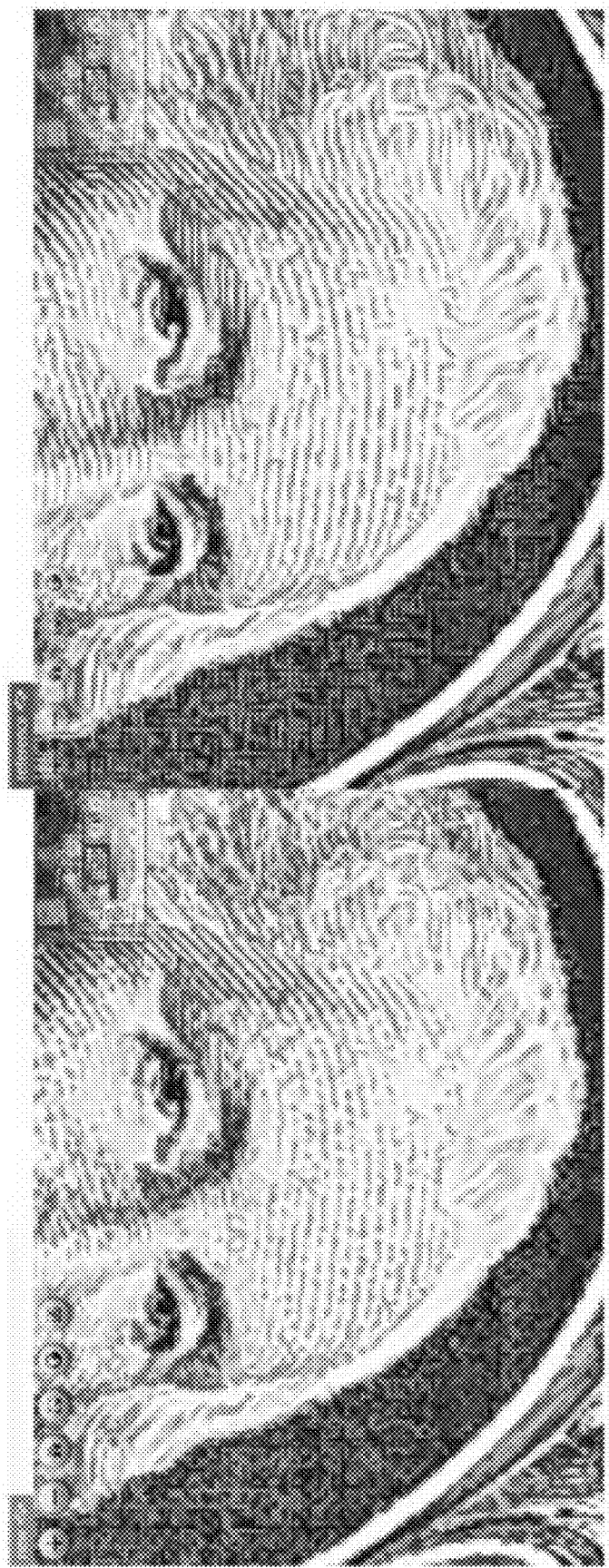
FIGS. 10-15 illustrate examples of down-up sampling, according to embodiments of the disclosure.
Figure 11:
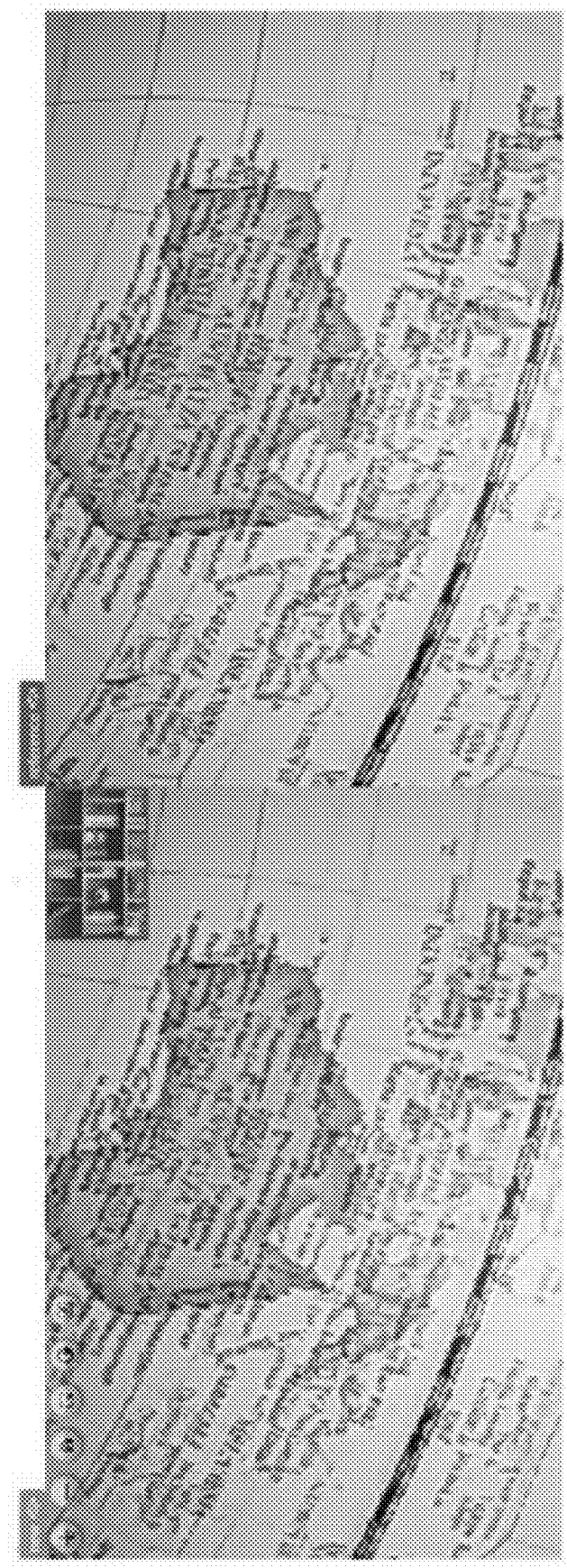
Figure 12:
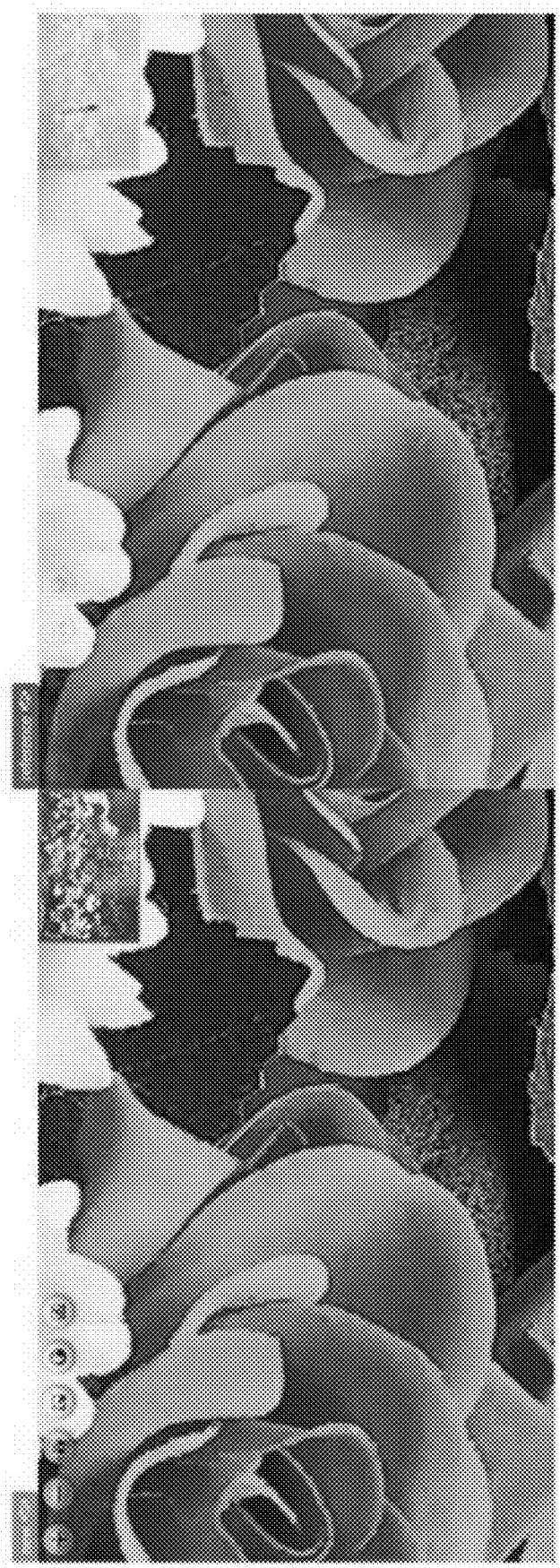

According to an embodiment, another guide used for up sampling is an edge map. In the case of an edge map, a first step is to draw imaginary straight lines between the estimated pixel to the 4 down sampled green pixels, as illustrated in FIG. 9. If one of the lines crosses an edge pixel, i.e., goes from non-edge to an edge pixel or vice-versa, than this pixel is not used in the interpolation.

According to an embodiment, to perform the interpolation, the relevant bilinear weights ($w_1$, $w_2$, $w_3$, $w_4$) are calculated:

$$\hat{p} = \underbrace{\frac{(A-d_x)(A-d_y)}{A^2}}_{w_1}g_1 + \underbrace{\frac{(A-d_x)(d_y)}{A^2}}_{w_2}g_2 + \underbrace{\frac{(d_x)(A-d_y)}{A^2}}_{w_3}g_3 + \underbrace{\frac{(d_x)(d_y)}{A^2}}_{w_4}g_4 = \sum_{i=1}^{4} w_i \cdot g_i$$

Note that $\Sigma_{i=1}^{4} w_i = 1$.

If a pixel $g_k$ is eliminated from the interpolation, the following is calculated:

$$\hat{p} = \frac{\sum_{i=1, i \neq k}^{4} w_i \cdot g_i}{\sum_{i=1, i \neq k}^{4} w_i}.$$

If there is only one pixel in the calculation, e.g., $g_j$, than the interpolation is very simple: $\hat{p}=g_j$. In the special case that all of the 4 pixels are eliminated, which should be rare, the closest down sampled pixel will be used: $\hat{p}=g_{closest}$.

According to an embodiment, an effect of a compressed data guided down-up sampling process is reducing the data size that undergoes the most processing, thus consuming less power and reducing the gate count in hardware implementations and reducing runtime in software implementations. Power consumption can be reduced by a factor of up to 50% with relatively little resolution loss as compared to simple down- and up-sampling schemes.

Figure 13:
Figure 14:
Figure 15:
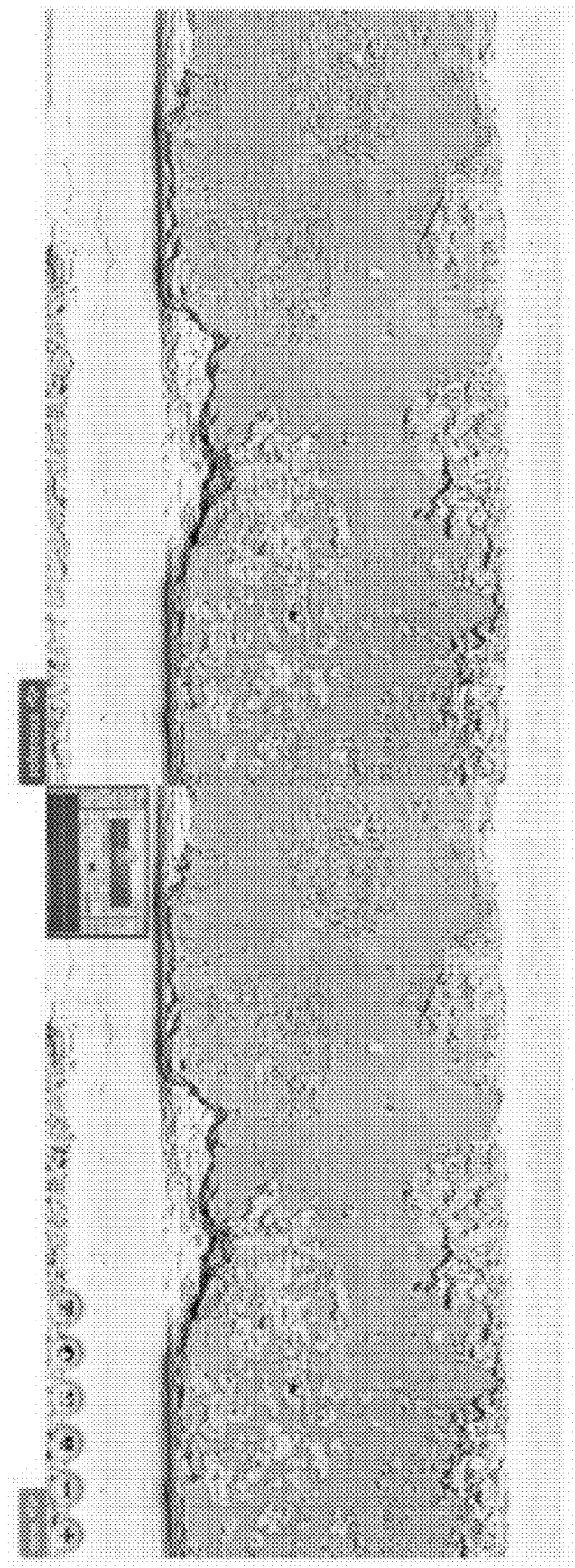

FIGS. 10 to 15 display comparisons between an image generated by a compressed data guided down-up sampling process according to an embodiment on the left, marked "new", and an image generated by a high resolution interpolation on the right, marked "reference". High resolution details are preserved in the new images even though the data is processed from low resolution input. In some cases, as illustrated in FIG. 13, a compressed data guided down-up sampling process according to an embodiment improves resolution due to noise reduction.

It is to be understood that embodiments of the present disclosure can be implemented in various forms of hardware, software, firmware, special purpose processes, or a combination thereof. In some embodiments, the present disclosure can be implemented in hardware as an application-specific integrated circuit (ASIC), or as a field programmable gate array (FPGA). In other embodiments, the present disclosure can be implemented in software as an application program tangible embodied on a computer readable program storage device. The application program can be uploaded to, and executed by, a machine comprising any suitable architecture.

FIG. 16 is a block diagram of a system that implements a method for CMOS image sensor compressed guide down-up sampling according to an embodiment of the disclosure. Referring now to FIG. 16, a computer system 161 for implementing the present invention can comprise, inter alia, a processor 162, a memory 163 and an input/output (I/O) interface 164. The computer system 161 is generally coupled through the I/O interface 164 to a display 165 and various input devices 166 such as a mouse and a keyboard. The support circuits can include circuits such as cache, power supplies, clock circuits, and a communication bus. The processor 162 may be a graphics processing unit (GPU) or dedicated hardware (HW). The memory 163 can include random access memory (RAM), read only memory (ROM), disk drive, tape drive, etc., or a combinations thereof. The present disclosure can be implemented as a routine 167 that is stored in memory 163 and executed by the processor 162. As such, the computer system 161 is a general purpose computer system that becomes a specific purpose computer system when executing the routine 167 of the present invention. Alternatively, as described above, embodiments of the present disclosure can be implemented as an ASIC or FPGA 167 that is in signal communication with the processor 162.

The computer system 161 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A method for down-up sampling of image sensor data, comprising the steps of:
   down sampling green pixels in a super Bayer pattern of image sensor data, wherein a decimation factor of the downsampling corresponds to a size of a color cluster in the super Bayer pattern, wherein two green pixels that are those closest to a non-green pixel cluster remain in each green cluster after downsampling, and wherein each non-green pixel cluster is bordered by four downsampled green pixels; and
   up sampling non-green color pixels in a non-green cluster from the remaining green pixels that are closest to the non-green cluster by a bilinear interpolation of each non-green pixel with respect to the closest remaining green pixels, wherein the up sampling of the non-green color pixels is guided by a compressed array that corresponds to the image sensor data.

2. The method of claim 1,
   wherein the decimation factor for an n×n color pixel array is $n^2$, and
   wherein down sampling green pixels comprises keeping pixels at two diagonally opposites corners of the n×n color pixel array while flipping the diagonally opposite corners for alternate pixel array rows.

3. The method of claim 1, wherein the compressed array is one of a pixel direction map or an edge map, wherein the pixel direction map specifies one of six directions for each pixel, wherein the six directions are horizontal, vertical, slash, backslash, flat, and unknown.

4. The method of claim 3, wherein the pixel direction map is determined by splitting the image sensor data into red, green and blue clusters, wherein the method further comprises
   within each cluster, determining if each pixel is flat by using a max-min measurement for each pixel and comparing the max-min measurement to a threshold, wherein if the max-min measurement for a pixel is below this threshold, the pixel is determined to be flat, and if the pixel is determined to be non-flat, determining a direction for the pixel.

5. The method of claim 4, wherein determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold.

6. The method of claim 5, wherein determining a direction for the pixel comprises
  calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch,
  wherein if a pixel direction's difference is not smaller than the other directions' differences within a predetermined interval, the pixel's direction is denoted as unknown.

7. The method of claim 3, wherein up sampling non-green color pixels in a non-green cluster using the direction map comprises:
  interpolating a flat or unknown direction pixel $\hat{p}$ in a cluster being up sampled from the down sampled green pixels $g_1$, $g_2$, $g_3$ and $g_4$ according to $$\hat{p} = \frac{(A-d_x)(A-d_y)}{A^2} g_1 + \frac{d_x(A-d_y)}{A^2} g_2 + \frac{d_x d_y}{A^2} g_3 + \frac{(A-d_x)d_y}{A^2} g_4,$$

wherein A is an edge length of the cluster being up sampled and $(d_x, d_y)$ are the distances of pixel $\hat{p}$ from green pixel $g_1$;
  interpolating a horizontal, vertical, slash or backslash direction pixel $\hat{p}$ in the cluster being up sampled according to $$\hat{p} = \frac{d_2}{d_1+d_2} g_1 + \frac{d_1}{d_1+d_2} g_2,$$

when there are down sampled green pixels $g_1$, $g_2$ collinear to pixel $\hat{p}$ in the direction, wherein $[d_1, d_2]$ are distances from pixel $\hat{p}$ to the collinear down sampled green pixel $g_1$, $g_2$, respectively;
  interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$
$$\hat{p}_1 = \frac{d_2}{d_1+d_2} g_1 + \frac{d_1}{d_1+d_2} g_2,$$
$$\hat{p}_2 = \frac{d_4}{d_3+d_4} g_3 + \frac{d_3}{d_3+d_4} g_4,$$

wherein $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively; and
  interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + c_z),$$
$$\hat{c}_1 = \frac{d_2}{d_1+d_2} g_1 + \frac{d_1}{d_1+d_2} g_2,$$
$$\hat{c}_3 = \frac{d_4}{d_3+d_4} g_3 + \frac{d_3}{d_3+d_4} g_4,$$

wherein $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

8. The method of claim 3, wherein up sampling non-green color pixels in a non-green cluster using the edge map comprises:
  drawing imaginary straight lines from a pixel $\hat{p}$ to be up sampled to each of the four down sampled green pixels, and eliminating a down sampled green pixel $g_k$ when an imaginary straight lines from a pixel $\hat{p}$ to down sampled green pixel $g_k$ crosses an edge pixel; and
  interpolating p from the four down sampled green pixels $g_1$, $g_2$, $g_3$ and $g_4$ according to $$\hat{p} = \frac{\sum_{i=1, i \neq k}^{4} w_i \cdot g_i}{\sum_{i=1, i \neq k}^{4} w_i},$$

wherein
$$w_1 = \frac{(A-d_x)(A-d_y)}{A^2},$$
$$w_2 = \frac{d_x(A-d_y)}{A^2},$$
$$w_3 = \frac{d_x d_y}{A^2},$$
and
$$w_4 = \frac{(A-d_x)d_y}{A^2},$$

wherein A is an edge length of the cluster being up sampled and $(d_x, d_y)$ are the distances of pixel $\hat{p}$ from green pixel $g_1$, wherein if all four downsampled green pixels are eliminated, interpolating $\hat{p}$ from the closest down sampled pixel: $\hat{p} = g_{closest}$.

9. A non-transitory program storage device readable by a computer, tangibly embodying a program of instructions executed by the computer to perform a method for down-up sampling of image sensor data, wherein the method comprises the steps of:
  down sampling green pixels in a super Bayer pattern of image sensor data, wherein the decimation factor for an n×n color pixel array is $n^2$, and wherein down sampling green pixels comprises keeping pixels at two diagonally opposites corners of the n×n color pixel array while flipping the diagonally opposite corners for alternate pixel array rows; and
  up sampling non-green color pixels in a non-green cluster from the remaining green pixels that are closest to the non-green cluster by a bilinear interpolation of each non-green pixel with respect to the closest remaining green pixels, wherein the up sampling of the non-green color pixels is guided by a compressed array that corresponds to the image sensor data.

10. The computer readable program storage device of claim 9, wherein a decimation factor of the downsampling corresponds to a size of a color cluster in the super Bayer pattern, and wherein two green pixels that are those closest to a non-green pixel cluster remain in each green cluster after downsampling, and wherein each non-green pixel cluster is bordered by four downsampled green pixels.

11. The computer readable program storage device of claim 9, wherein the compressed array is one of a pixel direction map or an edge map, wherein the pixel direction map specifies one of six directions for each pixel, wherein the six directions are horizontal, vertical, slash, backslash, flat, and unknown.

12. The computer readable program storage device of claim 11, wherein the pixel direction map is determined by splitting the image sensor data into red, green and blue clusters,
wherein the method further comprises, within each cluster, determining if each pixel is flat by using a max-min measurement for each pixel and comparing the max-min measurement to a threshold, wherein if the max-min measurement for a pixel is below this threshold, the pixel is determined to be flat,
and if the pixel is determined to be non-flat, determining a direction for the pixel.

13. The computer readable program storage device of claim 12, wherein determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold.

14. The computer readable program storage device of claim 13, wherein determining a direction for the pixel comprises
calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch,
wherein if a pixel direction's difference is not smaller than the other directions' differences within a predetermined interval, the pixel's direction is denoted as unknown.

15. The computer readable program storage device of claim 11, wherein up sampling non-green color pixels in a non-green cluster using the direction map comprises:
interpolating a flat or unknown direction pixel $\hat{p}$ in a cluster being up sampled from the down sampled green pixels $g_1, g_2, g_3$ and $g_4$ according to $$\hat{p} = \frac{(A-d_x)(A-d_y)}{A^2}g_1 + \frac{d_x(A-d_y)}{A^2}g_2 + \frac{d_xd_y}{A^2}g_3 + \frac{(A-d_x)d_y}{A^2}g_4,$$

wherein A is an edge length of the cluster being up sampled and $(d_x, d_y)$ are the distances of pixel $\hat{p}$ from green pixel $g_1$;
interpolating a horizontal, vertical, slash or backslash direction pixel $\hat{p}$ in the cluster being up sampled according to $$\hat{p} = \frac{d_2}{d_1+d_2}g_1 + \frac{d_1}{d_1+d_2}g_2,$$

when there are down sampled green pixels $g_1, g_2$ collinear to pixel $\hat{p}$ in the direction, wherein $[d_1, d_2]$ are distances from pixel $\hat{p}$ to the collinear down sampled green pixels $g_1, g_2$, respectively;
interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$
$$\hat{p}_1 = \frac{d_2}{d_1+d_2}g_1 + \frac{d_1}{d_1+d_2}g_2,$$
$$\hat{p}_2 = \frac{d_4}{d_3+d_4}g_3 + \frac{d_3}{d_3+d_4}g_4,$$

wherein $p_1$ and $p_2$ are two pixels closest to pixel $\hat{p}$ for which there are collinear down sampled green pixels, $g_1, g_2$ are the collinear down sampled green pixels closest to $p_1$ and $[d_1, d_2]$ are distances from pixel $p_1$ to the collinear down sampled green pixels $g_1, g_2$, respectively, and $g_3, g_4$ are the collinear down sampled green pixels closest to $p_2$ and $[d_3, d_4]$ are distances from pixel $p_2$ to the collinear down sampled green pixels $g_3, g_4$, respectively; and
interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + \hat{c}_2),$$
$$\hat{c}_1 = \frac{d_2}{d_1+d_2}g_1 + \frac{d_1}{d_1+d_2}g_2,$$
$$\hat{c}_2 = \frac{d_4}{d_3+d_4}g_3 + \frac{d_3}{d_3+d_4}g_4,$$

wherein $c_1$ and $c_2$ are two corner points closest to pixel $\hat{p}$ for which there are collinear down sampled green pixels, $g_1, g_2$ are the collinear down sampled green pixels closest to $c_1$ and $[d_1, d_2]$ are distances from point $c_1$ to the collinear down sampled green pixels $g_1, g_2$, respectively, and $g_3, g_4$ are the collinear down sampled green pixels closest to $c_2$ and $[d_3, d_4]$ are distances from point $p_2$ to the collinear down sampled green pixels $g_3, g_4$, respectively.

16. The computer readable program storage device of claim 11, wherein up sampling non-green color pixels in a non-green cluster using the edge map comprises:
drawing imaginary straight lines from a pixel $\hat{p}$ to be up sampled to each of the four down sampled green pixels, and eliminating a down sampled green pixel $g_k$ when an imaginary straight lines from a pixel $\hat{p}$ to down sampled green pixel $g_k$ crosses an edge pixel; and
interpolating p from the four down sampled green pixels $g_1, g_2, g_3$ and $g_4$ according to $$\hat{p} = \frac{\sum_{i=1,i\neq k}^{4} w_i \cdot g_i}{\sum_{i=1,i\neq k}^{4} w_i},$$

wherein $$w_1 = \frac{(A-d_x)(A-d_y)}{A^2},$$

$$w_2 = \frac{d_x(A-d_y)}{A^2},$$

$$w_3 = \frac{d_x d_y}{A^2},$$

and $$w_4 = \frac{(A-d_x)d_y}{A^2},$$

wherein A is an edge length of the cluster being up sampled and $(d_x, d_y)$ are the distances of pixel $\hat{p}$ from green pixel $g_1$, wherein if all four downsampled green pixels are eliminated, interpolating $\hat{p}$ from the closest down sampled pixel: $\hat{p} = g_{closest}$.

17. A method for down-up sampling of image sensor data, comprising the steps of:
  down sampling ween pixels in a super Bayer pattern of image sensor data, wherein the decimation factor for an n×n color pixel array is $n^2$, and wherein down sampling green pixels comprises keeping pixels at two diagonally opposites corners of the n×n color pixel array while flipping the diagonally opposite corners for alternate pixel array rows; and
  up sampling non-green color pixels in a non-green cluster from the remaining green pixels that are closest to the non-green cluster guided by a compressed array that corresponds to the image sensor, wherein the compressed array is one of a pixel direction map, wherein the pixel direction map specifies one of six directions for each pixel, wherein the six directions are horizontal, vertical, slash, backslash, flat, and unknown, wherein the pixel direction map is determined by splitting the image sensor data into red, green and blue clusters, within each cluster, determining if each pixel is flat by using a max-min measurement for each pixel and comparing the max-min measurement tri a threshold, wherein if the max-min measurement for a pixel is below this threshold, the pixel is determined to be flat, and if the pixel is determined to be non-flat, determining a direction for the pixel.

18. The method of claim 17, wherein determining if each pixel is flat further comprises associating a patch of pixels about each pixel, wherein the pixel patch is larger than a size of the color pixel array, calculating the max-min for each color group of pixels within the pixel patch, and determining a pixel at a center of the pixel patch to be flat when all three max-min values are below the threshold, and
  wherein determining a direction for the pixel comprises calculating the difference between every pair of adjacent pixels with the same color in the patch for the horizontal, vertical, slash and backslash directions, summing the differences in the same direction, and selecting a summation with a lowest sum of differences as a direction for the pixel at the center of the patch,
  wherein if a pixel direction's difference is not smaller than the other directions' differences within a predetermined interval, the pixel's direction is denoted as unknown.

19. The method of claim 17, wherein up sampling non-green color pixels in a non-green cluster from the remaining green pixels that are closest to the non-green cluster is performed by a bilinear interpolation of each non-green pixel with respect to the closest remaining green pixels, wherein the up sampling of the non-green color pixels is guided by a compressed array that corresponds to the image sensor data.

20. The method of claim 19, wherein up sampling non-green color pixels in a non-green cluster guided by the direction map comprises:
  interpolating a flat or unknown direction pixel $\hat{p}$ in a cluster being up sampled from the down sampled green pixels $g_1$, $g_2$, $g_3$ and $g_4$ according to $$\hat{p} = \frac{(A-d_x)(A-d_y)}{A^2}g_1 + \frac{d_x(A-d_y)}{A^2}g_2 + \frac{d_x d_y}{A^2}g_3 + \frac{(A-d_x)d_y}{A^2}g_4,$$

wherein A is an edge length of the cluster being up sampled and $(d_x, d_y)$ are the distances of pixel $\hat{p}$ from green pixel $g_1$;
  interpolating a horizontal, vertical, slash or backslash direction pixel $\hat{p}$ in the cluster being up sampled according to $$\hat{p} = \frac{d_2}{d_1+d_2}g_1 + \frac{d_1}{d_1+d_2}g_2,$$

when there are down sampled green pixels $g_1$, $g_2$ collinear to pixel $\hat{p}$ in the direction, wherein $[d_1, d_2]$ are distances from pixel $\hat{p}$ to the collinear down sampled green pixels $g_1$, $g_2$, respectively;
  interpolating a horizontal or vertical direction pixel $\hat{p}$ in the cluster being up sampled, when there are no down sampled green pixels collinear to pixel $\hat{p}$ in the direction, according to $$\hat{p} = \frac{1}{2}(\hat{p}_1 + \hat{p}_2),$$

$$\hat{p}_1 = \frac{d_2}{d_1+d_2}g_1 + \frac{d_1}{d_1+d_2}g_2,$$

$$\hat{p}_2 = \frac{d_4}{d_3+d_4}g_3 + \frac{d_3}{d_3+d_4}g_4,$$

wherein $p_1$ and $p_2$ are two pixels closest to pixel $\hat{p}$ for which there are collinear down sampled green pixels, $g_1$, $g_2$ are the collinear down sampled green pixels closest to $p_1$ and $[d_1, d_2]$ are distances from pixel $p_1$ to the collinear down sampled green pixels $g_1$, $g_2$, respectively, and $g_3$, $g_4$ are the collinear down sampled green pixels closest to $p_2$ and $[d_3, d_4]$ are distances from pixel $p_2$ to the collinear down sampled green pixels $g_3$, $g_4$, respectively; and
  interpolating a slash or backslash direction pixel $\hat{p}$ in the cluster being up sampled, when there are no down sampled green pixels collinear to pixel $\hat{p}$ in the direction, according to $$\hat{p} = \frac{1}{2}(\hat{c}_1 + \hat{c}_2),$$

$$\hat{c}_1 = \frac{d_2}{d_1+d_2}g_1 + \frac{d_1}{d_1+d_2}g_2,$$

-continued
$$\hat{c}_2 = \frac{d_4}{d_3+d_4}g_3 + \frac{d_3}{d_3+d_4}g_4,$$

wherein $c_1$ and $c_2$ are two corner points closest to pixel $\hat{p}$ for which there are collinear down sampled green pixels, $g_1$, $g_2$ are the collinear down sampled green pixels closest to $c_1$ and $[d_1, d_2]$ are distances from point $c_1$ to the collinear down sampled green pixels $g_1$, $g_2$, respectively, and $g_3$, $g_4$ are the collinear down sampled green pixels closest to $c_2$ and $[d_3, d_4]$ are distances from point $p_2$ to the collinear down sampled green pixels $g_3$, $g_4$, respectively.

* * * * *